Jan. 4, 1938.  W. ACKERMAN  2,104,004
COMBINED CULTIVATOR AND WEED CUTTER
Filed Sept. 15, 1936   2 Sheets—Sheet 2
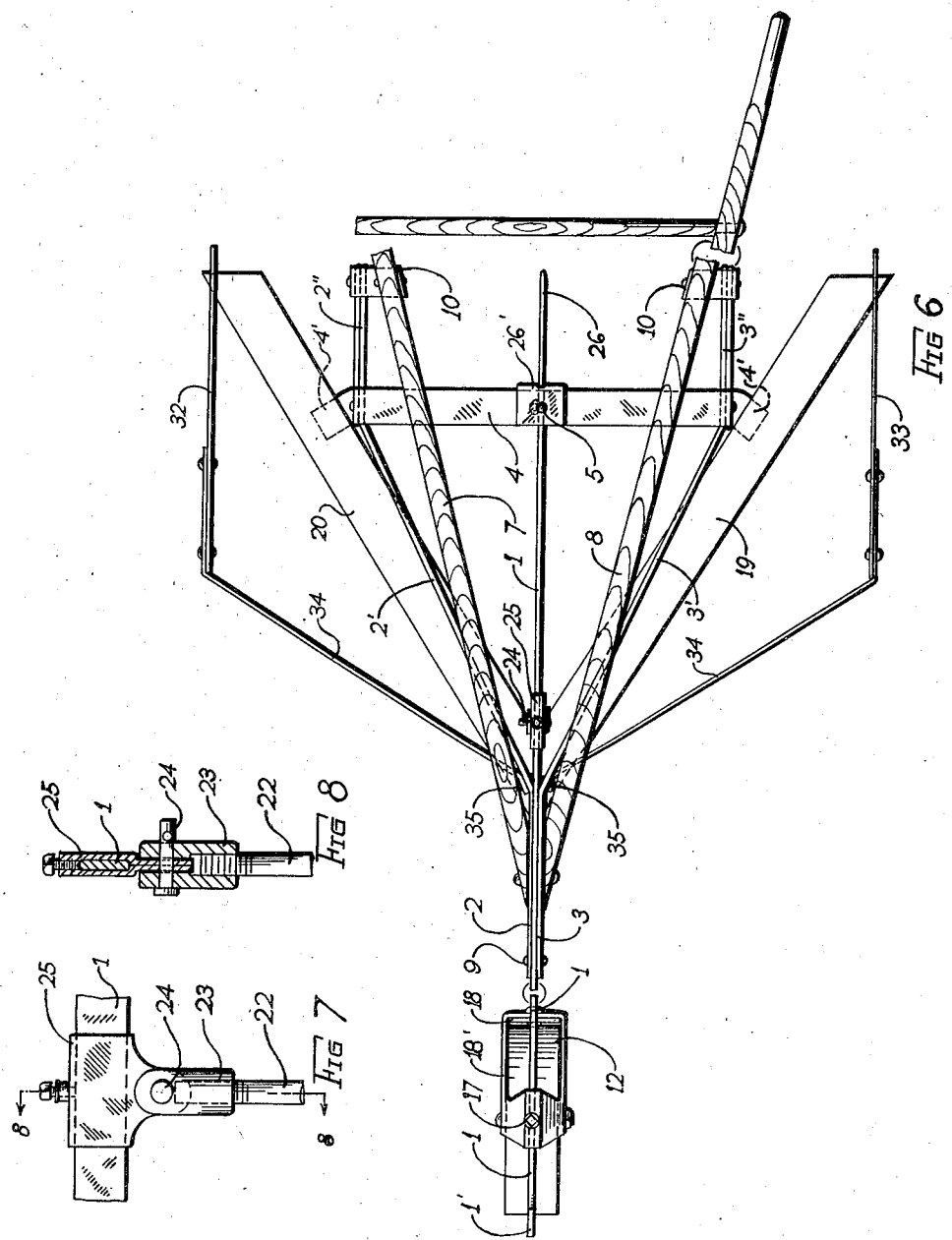
INVENTOR
William Ackerman
BY Staley & Welch
ATTORNEYS Patented Jan. 4, 1938

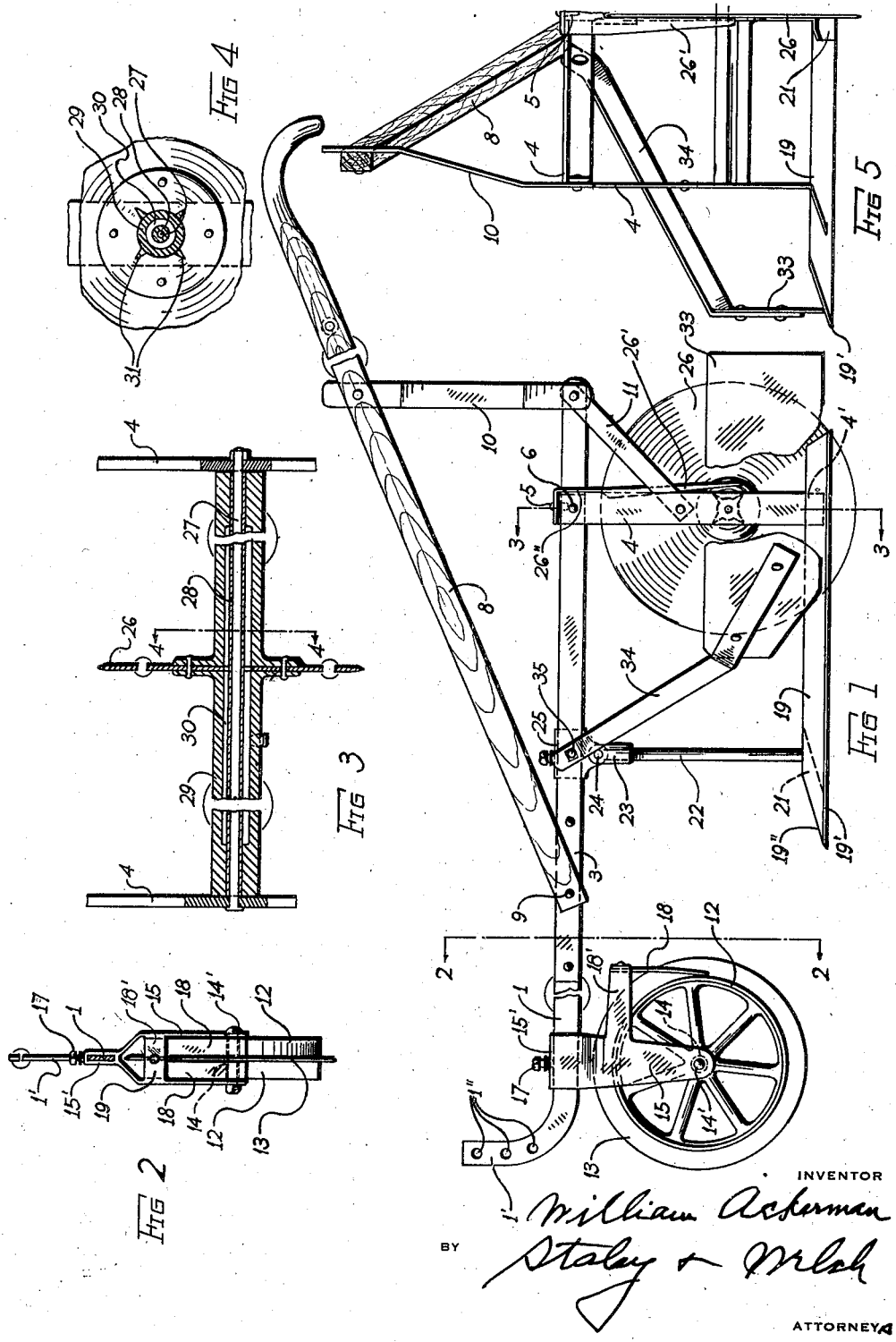

2,104,004

UNITED STATES PATENT OFFICE 2,104,004

COMBINED CULTIVATOR AND WEED CUTTER

William Ackerman, London, Ohio

Application September 15, 1936, Serial No. 100,867

3 Claims. (Cl. 97—169)

This invention relates to a combined weed cutter and cultivator, the machine being particularly adapted for cutting such weeds as thistles, milk weed and vines in corn fields, melon patches or any other place where cultivating is desirable.

The object of the invention is to provide a machine of the character described which will be simple in construction, economical in manufacture and effective for the purpose for which it is designed.

In the accompanying drawings:

Fig. 1 is a side elevation of a machine embodying the improvements.

Fig. 2 is a section on the line 2—2 of Fig. 1.

Fig. 3 is a section on the line 3—3 of Fig. 1.

Fig. 4 is a section on the line 4—4 of Fig. 3.

Fig. 5 is a rear elevation of one side of the machine, one of the handle bars being shown in section.

Fig. 6 is a top plan view of the machine.

Fig. 7 is a detail in side elevation of a portion of the support for the forward end of the cultivating blades.

Fig. 8 is a section on the line 8—8 of Fig. 7.

Referring to the drawings, the main frame of the machine consists of a longitudinally extending member 1, side members 2 and 3 and inverted U-shaped member 4. The forward end of the longitudinal member 1 is bent upwardly as indicated at 1′ and apertured to receive any suitable form of hitch; three apertures 1″ being indicated in the present case. The side members of the frame have their forward ends bolted or otherwise suitably secured to the member 1 and are then diverged rearwardly as indicated at 2′ and 3′ and thence extended parallel to each other and with the member 1 as indicated at 2″, 3″. The intermediate portion of the member 4 is connected to the rear end of the frame member 1 by a bolt 5. The side arms of the member 4 are secured to the rear parallel portions of the frame members 2 and 3 by bolts 6. Handle members 7 and 8 have their forward ends secured to the frame by bolts 9 and have their rear ends supported by arms 10, the lower ends of which are secured at the rear ends of the parallel portions 2″, 3″ of the side frame members 2 and 3; braces 11, the upper ends of which are secured to the frame members 2″ and 3″ at the points where they are connected with the arms having their lower ends secured to the sides of the yoke 4 being preferably employed to strengthen the structure.

The forward end of the frame is supported by a gauge wheel 12, the periphery of which is provided with a centrally disposed sharpened steel ring 13, for the purpose of cutting vines as the machine progresses. The hub of this wheel 12 is journalled upon a bushing 14 shown in dotted lines in Figs. 1 and 2, this bushing being clamped by a bolt 14′ between the lower ends of the arms of a bifurcated cast bracket 15, the upper end of which is converged to form a clip 15′ that slidably embraces the frame member. This clip 15′ is capable of a sliding movement upon the frame member 1 and is held in different positions of adjustment on the frame member by a set screw 17 as shown in Figs. 1, 2 and 6; this adjustment being for the purpose of permitting the gauge wheel to be adjusted for the purpose hereinafter explained.

A scraper is provided for the wheel 12 consisting of a split blade 18 which straddles the ring 13, these blades being secured to the intermediate member of a U-shaped auxiliary bracket 18′ which projects rearwardly from the bracket 15 and is preferably formed integral therewith.

For cultivating purposes and also for the purpose of eliminating weeds there is provided a pair of forwardly converging blades 19 and 20. Each of these blades besides converging forwardly is beveled downwardly in a transverse direction so as to provide a sharp cutting edge 19′ and a point 19″; each blade being flat on its under surface. The forward end of each of these blades is secured to a plate 21. (See Fig. 5). Connected to this plate 21 is a vertically extending rod 22, the upper end of which has a threaded connection with a nipple 23 which is connected by a removable pin 24 to a clip 25 which is rigidly connected to the intermediate frame member 1. The purpose of the adjustability of this rod 22 is to permit the blades 19 and 20 to be positioned correctly with relation to the frame of the machine in the initial assembly of the parts of the machine. Each of the cultivating blades is rigidly connected near its rear end to an angularly projecting portion 4′ at the lower end of one of the legs of the U-shaped frame member 4.

In order to prevent sidewise skidding of the machine in operation there is provided a disk 26 which is positioned centrally between the cultivating blades 19 and 20. This disk is carried by a long bolt 27 which is non-rotatably secured to the legs of the U-shaped frame member 4 and serves to clamp between the legs a bushing 28 which surrounds the bolt. The disk 26 has secured thereto elongated hub members 29 which rotate freely upon the bushing. This disk is a comparatively thin one with a sharpened edge which readily penetrates the ground and not only serves to prevent skidding but also to cut any vines or weeds which may come within its path. (See Fig. 3 for detail.) As shown in Fig. 4, each of these hub members bear upon the bushings only at the ends thereof, leaving an intermediate space 30 for the reception of a lubricant. Each of the hub members 29 is provided with a series of teeth 31 which extend throughout the length thereof, these teeth serving to prevent accumulation of trash about the hub members by cutting the weeds or trash into small pieces. A pair of scrapers 26', one only of which is shown (see Figs. 1 and 5) is provided for the disk 26, these scrapers being integrally connected with the plate 26", the upper end of which is bent at right angles to the main portion and secured to the U-shaped member 4 by the bolt 5.

The cultivating and weed cutting blades 19 and 20 are intended to penetrate the ground at a depth from zero to approximately three inches depending upon the adjustment and the action of these blades is not only to cultivate but to sever and uproot weeds. The depth of penetration is regulated by the adjustment of the gauge wheel 12 upon the frame member 1 in connection with the means for adjusting the connection of the hitch. For the deepest point of penetration of the blades 19 and 20 the gauge wheel is moved to its foremost position on the frame member 1 and the hitch connection is made at the lower hole 1". For a shallow penetration of the blades 19 and 20 the gauge wheel is adjusted to its rearmost position on the frame member 1 and the hitch is made at the upper hole. When it is desired that the blade should penetrate the ground at an intermediate point the gauge wheel is adjusted to an intermediate point on the frame member 1 and the hitch is made to the intermediate hole 1".

It will be noticed that this machine does not have any side carrying wheels so it is possible to have the blades 19 and 20 run close to the plants. In cultivating and weeding certain plants such as corn, particularly in the early stages of the growth of the plants, it is desirable to prevent the earth from being thrown onto and burying the plants. To prevent this, I provide guards or fenders on each side of the machine, indicated at 32 and 33, which extend longitudinally and in parallel relation with each other. Each of these guards is a thin sheet of metal which intersects the corresponding blade near the rearward tip thereof and is supported by an arm 34. These arms are connected to the diverging frame members by bolts 35 so that they can be entirely removed after the plants have reached a height at which they need no further protection.

Having thus described my invention, I claim:

1. In a machine of the character described, a frame comprising an inverted U-shaped member, a pair of rearwardly diverged blades having their rear ends rigidly connected with said U-shaped member, a vertically extending rod connected with the forward portions of said blades and also with said frame, a gauge wheel adjustably mounted on said frame in advance of said blades, a non-rotatable axle supported by the legs of said U-shaped frame member, a non-rotatable bushing mounted on said axle, an anti-skid disk, and extended hub members connected with said disk and rotatably mounted on said bushing.

2. In a machine of the character described, a frame comprising an inverted U-shaped member, a pair of rearwardly diverged blades having their rear ends rigidly connected with said U-shaped member, a vertically extending rod connected with the forward portions of said blades and also with said frame, a gauge wheel adjustably mounted on said frame in advance of said blades, a non-rotatable axle supported by the legs of said U-shaped frame member, a non-rotatable bushing mounted on said axle, an antiskid disk, extended hub members connected with said disk and rotatably mounted on said bushing, and a plurality of blades on each of said hub members extending throughout the length thereof.

3. In a machine of the character described, a frame consisting of a longitudinally extending member, a pair of side members and an inverted U-shaped member, means for connecting the forward ends of said side members to said longitudinally extending member, means for connecting the horizontal portion of said U-shaped member to said longitudinally extending frame member, means for connecting the side legs of said U-shaped member and said side frame members, a gauge wheel connected with the forward end of said longitudinally extending member, a pair of forwardly converged blades, an adjustable rod for connecting the forward portions of said blades with said longitudinally extending frame member, means for connecting the rear ends of the blades respectively with the side legs of said U-shaped frame member, and a disk rotatably supported by the side legs of said U-shaped member and positioned centrally between said cutting blades.

WILLIAM ACKERMAN.